(12) United States Patent
Haehn et al.

(10) Patent No.: US 6,237,401 B1
(45) Date of Patent: May 29, 2001

(54) MODULATOR MIS-WIRE TEST

(75) Inventors: Craig S. Haehn, Avon Lake; Charlie E. Ross, Nova; Ken Grolle, Elyria, all of OH (US)

(73) Assignee: AlliedSignal Truck Brake Systems Company, Elyria, OH (US)

( * ) Notice: Subject to any disclaimer, the term of this patent is extended or adjusted under 35 U.S.C. 154(b) by 0 days.

(21) Appl. No.: 09/292,430

(22) Filed: Apr. 15, 1999

(51) Int. Cl.[7] .................................................. G01L 5/28
(52) U.S. Cl. ............................................................ 73/129
(58) Field of Search ................................. 73/116, 117.2, 73/117.3, 118.1, 119 R, 121, 128, 129; 340/438, 439

(56) References Cited

U.S. PATENT DOCUMENTS 5,327,781   7/1994   Moran .
5,782,541 * 7/1998   Schappler .
6,097,998 * 8/2000   Lancki .

* cited by examiner

Primary Examiner—Eric S. McCall

(57) ABSTRACT

A testing system and method are provided for an electronically controlled braking system to determine whether the solenoids of each of the modulators are properly wired. According to the test, each modulator is tested in sequence. The exhaust solenoid of a modulator is actuated multiple times and the hold solenoid of a modulator is actuated once. Discrete signals will evidence whether the modulator solenoids have been properly wired.

12 Claims, 4 Drawing Sheets

MODULATOR MIS-WIRE TEST

BACKGROUND OF THE INVENTION

This invention relates to monitoring and testing of a vehicle braking system, and more particularly to monitoring and testing an electronically controlled braking system for an automotive vehicle equipped with pneumatically actuated brakes to determine if there is a mis-wired brake system modulator. Although the present invention may be used with adaptive braking systems, it is also intended for use with other electronically controlled braking systems, such as electropneumatic braking systems.

Generally, it is necessary for a driver to be sure that a vehicle braking system is working properly at all times. Accordingly, it is common to provide a series of checks upon starting the vehicle to assure that the electronically controlled braking system is operating properly. one check relates to the solenoids associated with a brake pressure modulator and the associated electrical circuits which operate the valves and selectively control communication with the vehicle brakes. For example, it is important to discern whether the solenoids are either electrically open or shorted. if it is determined that an electrically open or shorted condition exists in the solenoid circuit, the braking system is shut down and the vehicle driver is provided a suitable warning signal.

Typically, the brake pressure modulator includes an inlet or hold valve, which controls communication with a pressure source, and an exhaust valve which is selectively actuated to exhaust braking pressure to atmosphere. If the exhaust valve is actuated, the inlet or hold valve must also be actuated to preclude dumping the air supplied to the modulator from the pressure source to atmosphere.

The braking system further includes an electronic control unit (ECU), which receives inputs from speed sensors which measure speeds of the vehicle wheels. The ECU processes these wheel speed signals to determine if one or more of the vehicle wheels is about to lock up. If an incipient lock-up condition is sensed, the ECU actuates the inlet or hold solenoid valve, which blocks communication between the pressure source and the brake actuator to thereby hold the pressure level then existing in the actuator. Pressure in the brake actuator is dumped to atmosphere by simultaneously actuating both the hold and exhaust valves.

Three wires connect the ECU with each modulator. One wire is a source wire that supplies power to both solenoids. A second wire provides a ground to the inlet or hold valve if a hold function is desired. Finally, a third wire supplies a ground to the exhaust valve if an exhaust function is desired. On occasion the hold and exhaust wires are reversed. Since the resistance of both of the solenoids is the same, the ECU cannot easily detect the reversed condition of the wires.

In U.S. Pat. No. 5,327,781 miswiring is detected based on the difference in the exhaust sound generated by a correctly wired modulator versus an incorrectly wired modulator. Particularly, when properly wired, the hold solenoid is actuated for ten milliseconds compared to an incorrectly wired modulator which provides an exhaust pulse on the order of thirty milliseconds. This time difference or difference in exhaust sound is not sufficient to consistently identify an incorrectly wired modulator during testing.

When modulators have been incorrectly wired by the original equipment manufacturers or by a mechanic, extended stopping distances of vehicles may be encountered or excessive system pressure may be exhausted during a traction control or ABS event.

The present invention contemplates a new and improved apparatus and method which overcomes the above referenced problems and others and provides a consistent and efficient detection method to determine if a modulator has been miswired.

SUMMARY OF THE INVENTION

In accordance with the present invention, there is provided an improved apparatus and method for testing an electronically controlled braking system. According to another aspect of the invention, the apparatus and method includes determining if exhaust and hold solenoid valves in a modulator controlling a brake sub-system of at least one wheel on a vehicle are properly wired. First, a brake pedal in a vehicle is depressed. Then, an ignition of the vehicle is turned on to power the vehicle and ECU. The system uses the ECU to determine if at least one of the exhaust and the hold solenoid valves is open or short circuited. If the determination is positive, present information of the vehicle is stored in a storage device in the ECU and testing is aborted. If the determination is negative, the test apparatus and method pauses for a predetermined period of time. As an example, the system then energizes a first one of the hold solenoid valves at least twice, and then energizes one of the exhaust solenoid valves once. Finally, the system determines whether there are two or more signals generated from the energizing step. If there are two or more signals, e.g. audible signals, the solenoid valves are mis-wired.

According to another limited aspect of the present invention, the system serially performs the pausing and valve energizing for the modulator for a plurality of the wheels.

An advantage of this invention is that the miswiring of solenoid valves in a modulator can be more consistently detected.

Another advantage of the invention is that the prospects for miswiring solenoids is reduced.

Still other benefits and advantages of the invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
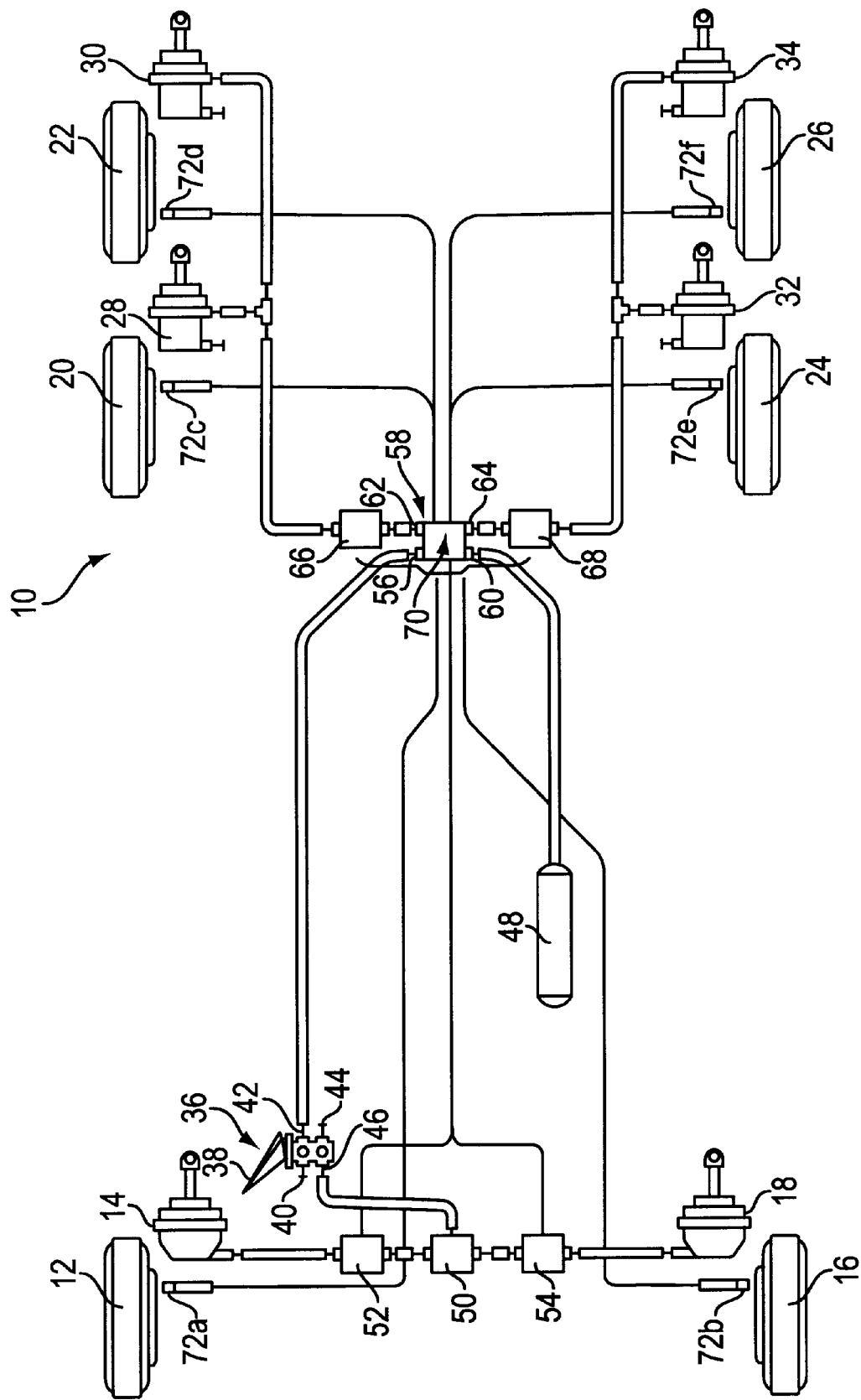
FIG. 1 is a schematic illustration of a partial air brake system for an automotive vehicle which is equipped with an adaptive braking system to control wheel lock.

With reference to FIG. 1, an air brake system, generally indicated by numeral 10, includes right front wheel 12 and associated brake actuator 14, left front wheel 16 and associated brake actuator 18, and a double rear axle assembly comprising right rear wheels 20, 22, left rear wheels 24, 26 and associated tandem brake actuators 28, 30, 32, and 34, respectively. The system 10 further includes an operator actuated, brake valve 36 having a treadle 38 actuated by the vehicle operator. When the treadle 38 is actuated the valve 36 allows communication between inlet port 40 and outlet port 42 and simultaneously communicates inlet port 44 with outlet port 46 in a manner well known to those skilled in the art. The system 10 further includes a source of air pressure, such as reservoir 48, which is charged by an air compressor operated by the vehicle engine (not shown). The port 44 communicates with the pressure source 48, but for clarity these communication lines have been omitted from the drawing. Outlet port 46 is communicated to the right and left wheel actuators 14, 18 through a conventional quick release valve 50 and right and left front wheel modulators 52, 54. Outlet port 42 of brake valve 36 is connected to control port 56 of a conventional relay valve generally indicated by the numeral 58. Supply port 60 of relay valve 58 communicates with the pressure source 48 and outlet ports 62, 64 of relay valve 58 are connected respectively to the right rear wheel actuators 28, 30 and left rear wheel brake actuators 32, 34 through right rear wheel brake modulator 66 and left rear wheel modulator 68. The modulators 52, 54, 66, and 68 will be described in greater detail below with reference to FIG. 2.

Traditionally, the electronic control unit (ECU) for the braking system which controls the modulators 52, 54, 66, and 68 is housed in the cover of the relay valve 58. Accordingly, the ECU is indicated generally by the numeral 70. Speed sensors 72A–F associated with selected ones of the wheels sense the speed of the associated wheel and generate signals which are transmitted to the ECU 70 via the lines indicated on the drawing. Similarly, actuating signals generated by the ECU 70 when, for example, an incipient skidding condition of one of the wheels is detected are transmitted to the modulators 52, 54, 66, and 68 through the leads connecting the ECU 70 and the corresponding modulators as illustrated in FIG. 1.

Figure 2:
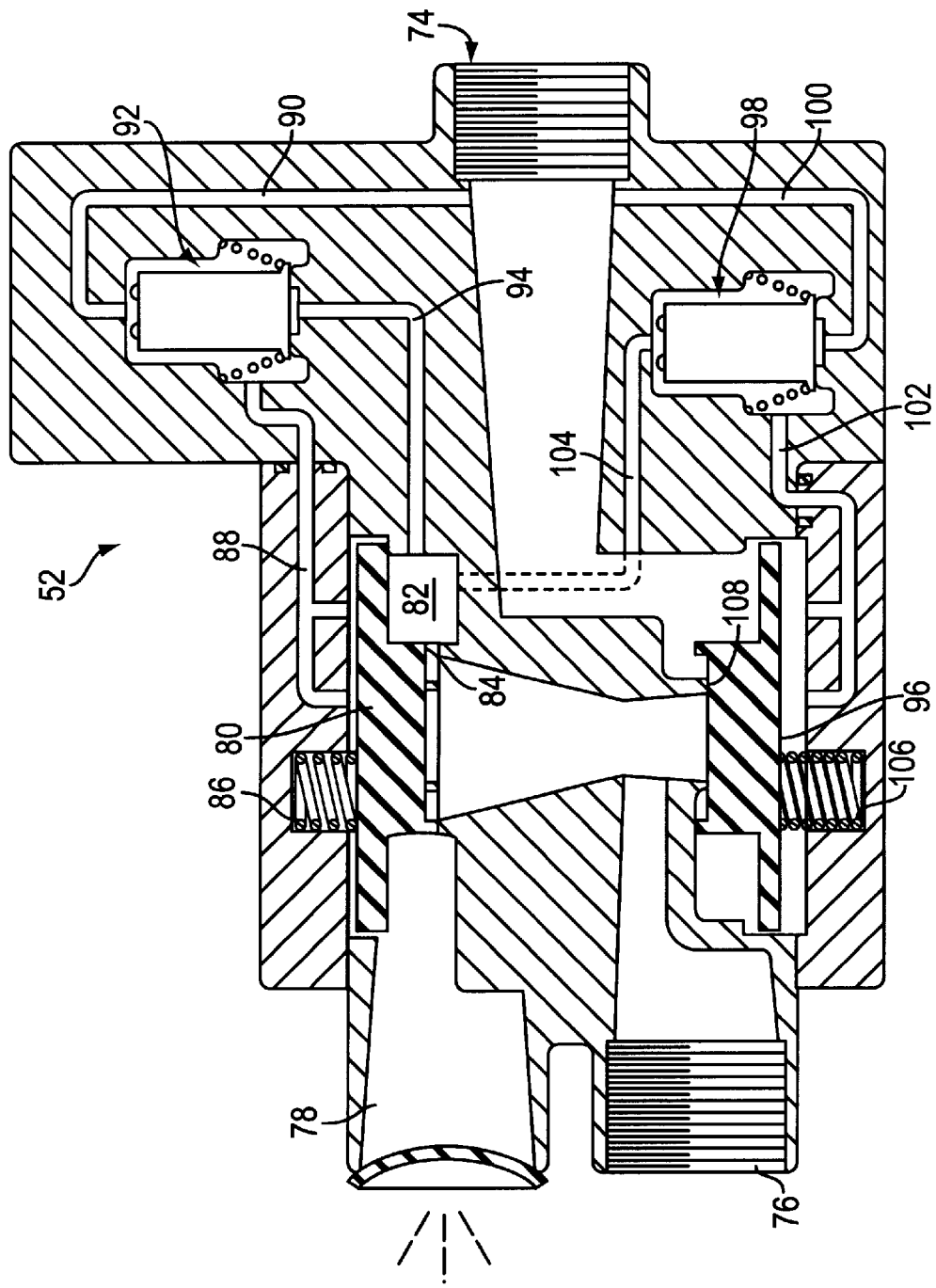
FIG. 2 is a cross-sectional view of a modulating valve of the type used in the system of FIG. 1.

Referring now to FIG. 2, the representative modulator 52 will now be described in detail, it being understood that modulators 54, 66, and 68 are structurally and functionally identical unless specifically noted to the contrary. Modulator 52 includes an inlet or supply port generally indicated by 74, and outlet or delivery port 76, which communicates with the corresponding brake actuator, and an exhaust port 78 which communicates with ambient atmosphere.

An exhaust diaphragm 80 is moveable within an exhaust cavity 82 and urged into sealing engagement with exhaust seat 84 by a spring 86 and by air pressure communicating against the upper surface of the diaphragm 80 through passage 88. Passage 88 is normally connected through passage 90 with supply port 74 when the exhaust solenoid valve indicated by the numeral 92 is in its normally open position. In the normally open position, valve 92 allows communication between passages 88 and 90 and closes communication through passage 94, which communicates with exhaust chamber 82. Accordingly, upon energizing exhaust solenoid 92, passage 90 is sealed off and passage 88 is communicated to 94, whereupon higher pressure air at outlet port 76 lifts the exhaust diaphragm 80 off the seat 84 to permit venting of the pressure level at outlet delivery port 76 through exhaust port 78.

Similarly, a supply or hold diaphragm 96 is interposed in the communication path between the supply or inlet port 74 and the outlet or delivery port 76 and is normally closed as illustrated in FIG. 2. Supply diaphragm 96 is controlled by a hold or supply solenoid valve 98. When in its normally closed position illustrated in FIG. 2, the hold diaphragm closes off passage 100 which communicates with the supply port 74 and vents passage 102 to exhaust port 78. More particularly, passage 102 allows communication between the control surface of the hold diaphragm 96 and passage 104 which communicates with exhaust port 78 through the exhaust chamber 82 when valve 98 is in its normally closed condition. Upon energizing of the valve 98, the passage 104 is closed off and passage 100 communicates with passage 102 thereby admitting supply air from inlet port 74 to the control surface of diaphragm 96. Control pressure acting on diaphragm 96 is supplemented by spring 106 to urge the diaphragm 96 into sealing engagement with valve surface 108, thereby closing off communication between the supply inlet port 74 and the outlet or delivery port 76. As discussed above, the supply or hold valve 98 would also be actuated upon actuation of the exhaust solenoid valve 92, to prevent pressure at the supply or inlet port 74 from exhausting to an atmosphere through exhaust port 78. It will be appreciated that the modulator valve 52 shown and described is merely representative of this type of valve. The present invention, however, can be used with other modulator valves that, although structurally different, provide the same features and benefits as described above.

Figure 3:
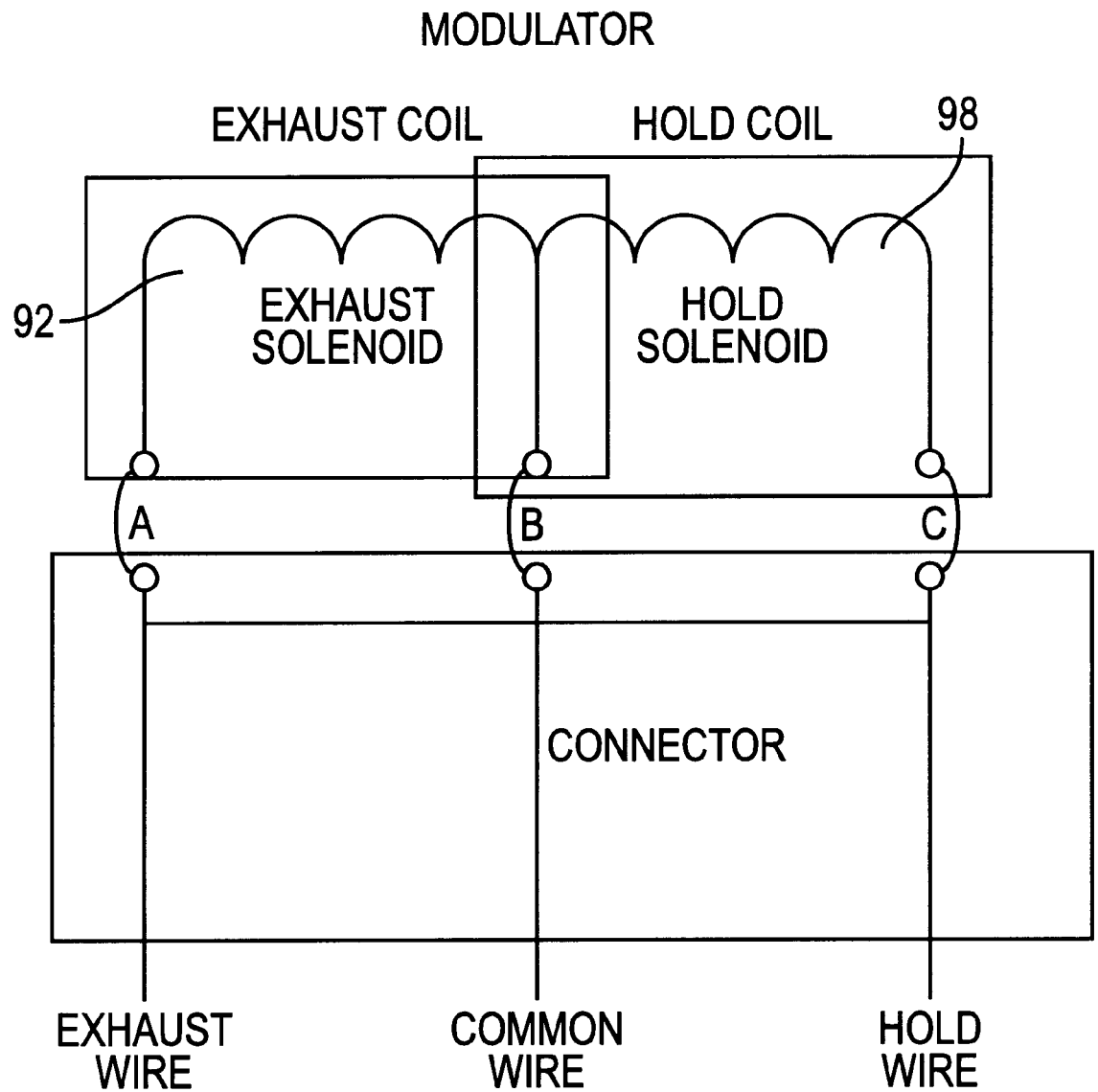
FIG. 3 shows a modulator circuit schematic for the preferred embodiment.

Referring now to FIG. 3, there is shown a modulator circuit with an exhaust coil and a hold coil and a three pin connection to the solenoids of the modulator valve. Node A of the exhaust coil side of the modulator circuit is connected to the exhaust solenoid 92, node B in the modulator is the common connection for both the exhaust solenoid 92 and the hold solenoid 98, and node C is the connection for the hold solenoid coil and hold solenoid 98. As indicated above, if the connections at nodes A and C are inadvertently interchanged, the ECU may not detect the incorrectly wired modulator. Accordingly, the following test procedure was developed to analyze and verify proper wiring of the solenoids.

Figure 4:
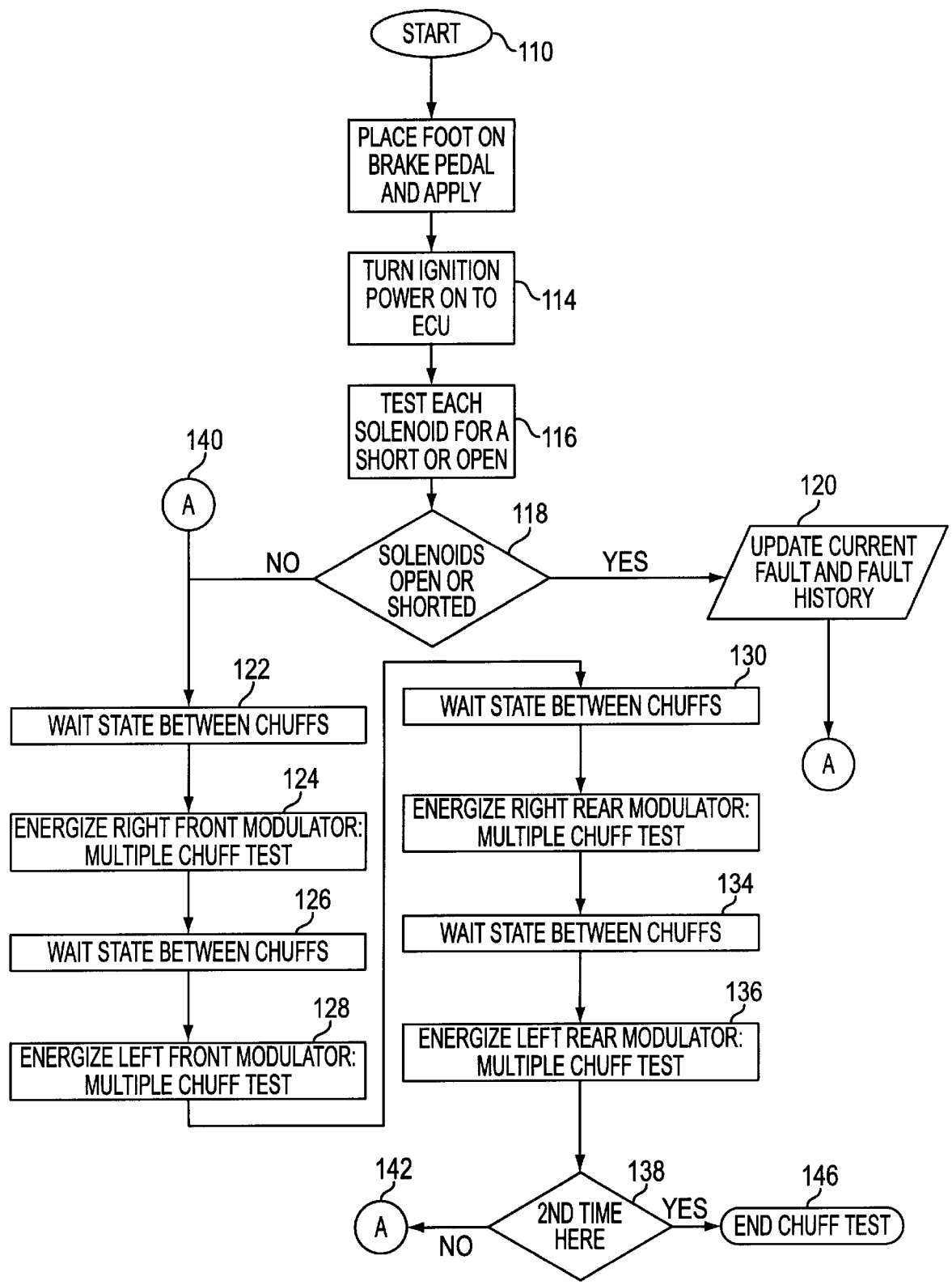
FIG. 4 is a flow block diagram illustrating the manner in which the electronic control unit of the system illustrated in FIG. 1 performs the testing function of the present invention.

Turning now to FIG. 4, a subroutine programmed within the ECU 70 in order to perform the wiring test is illustrated schematically. The test is initiated at 110 and requires that the treadle 38, or brake pedal, is depressed while the ignition key is turned on, as indicated at 114. This also powers the ECU 70. The test then proceeds to interrogate each of the solenoids and each of the modulators for an open or shorted condition, as indicated at 116. As is known in the art, testing of the solenoids includes and audible clicking or popping associated with actuating the solenoid (sometimes referred to as a "Chuff" test). An observer listens for the actuating noises of the modulator solenoids in a predetermined pattern established by test protocol. As indicated at 118, the results of the test made at 116 are processed. If any of the solenoids are electronically opened or shorted, the wiring test according to the present invention is aborted as indicated at 120 and an update of the current fault and fault history is stored in the memory of ECU 70. A corresponding warning light (not shown) is actuated to provide a visual notification of the fault.

Assuming that there are no open or shorted solenoids, there is a short wait state between solenoid tests. As indicated at 122, the ECU 70 then recognizes the right front modulator where multiple solenoid actuation tests are performed by energizing, for example, the hold solenoid multiple times and the exhaust solenoid once. This will produce a distinct difference from the exhaust sound if the modulator is wired incorrectly, as is indicated at 124. After this is done, the program imposes another wait state between solenoid actuation tests as indicated at step 126 and then energizes the left front modulator using the same multiple solenoid actuation tests by energizing the hold and exhaust solenoids multiple times. Again, if the modulator is wired incorrectly as indicated at 128 a distinct audible signal will be heard. After still another wait state between solenoid actuations, as indicated at 130, the solenoids of the right rear modulator 66 are actuated for a test procedure and the program then executes another wait state, as indicated at 134. The solenoids of the left rear modulator 68 are then monitored as indicated at 136, thus completing all four modulators of the brake system.

As indicated at step 138, the program determines next if this is the first or second time that this test has been performed. If it is determined that this is the second time the test has been performed, the solenoid actuated testing is terminated as indicated at 146. If this is the first time that this test has been performed, the test is repeated as indicated at 142 by starting at step 140 and running through steps 132–138 for a second time. The program will end once the second time is completed at 146.

The process described above in which each hold solenoid of the modulator is actuated multiple times and the exhaust solenoid is actuated once produces a distinct, audible signal to the test operator/observer. If the modulator is improperly wired the modulator will exhaust multiple times. On the other hand, if the connector is properly wired, the modulator will exhaust once. By interrogating each solenoid of each modulator through this routine, an effective test of the wire connection is achieved.

The invention has been described with reference to the preferred embodiments. Obviously, modifications and alterations will occur to others upon reading and understanding the proceeding detailed description of the preferred embodiment. It is intended that the invention be construed as including all such alterations and modifications insofar as a they fall within the scope of the appended claims with the equivalents thereof.

Having thus described the preferred embodiment, the invention is claimed to be:

1. An apparatus for testing an electronically controlled braking system, the apparatus including:

a pressure source of air;

a braking sub-system, with a modulator, for at least one wheel, wherein the modulator is controlled by an electronic control unit to control a braking pressure of the at least one wheel, the modulator further including:

a hold solenoid valve and an exhaust solenoid valve wherein the hold solenoid valve regulates a first air flow from the pressure source of air passing through the modulator and wherein the exhaust solenoid valve regulates a second air flow passing from the modulator to an ambient atmospheric area of the apparatus; and, wherein upon activation of a testing signal for the braking system, the electronic control unit energizes a first one of the hold and exhaust solenoid valves a first number of times greater than or equal to one and the electronic control unit energizes a second one of the hold and solenoid valves a second number of times greater than or equal to one, said second number being different than said first number such that a sound is generated when the solenoids in the modulator are correctly wired that is different than a sound that is generated when the solenoids are miswired.

2. The apparatus as claimed in claim 1, wherein:

the vehicle has a plurality of modulators and the electronic control unit serially tests each of the hold and exhaust solenoid valves for each modulator.

3. The apparatus of claim 2, wherein:

the electronic control unit pauses a predetermined amount of time after energizing the hold solenoid valve and the exhaust solenoid valve for each modulator.

4. The apparatus of claim 3, wherein the vehicle further includes:

a brake pedal and an ignition system, wherein the electronic control unit commences said serial testing when the brake pedal is depressed before the ignition system is actuated wherein the testing is performed just after the actuation of the ignition system.

5. The apparatus of claim 4, wherein:

the electronic control unit further tests to determine if one of the hold and exhaust solenoid valves is open-circuited or short-circuited, wherein if the results of said further test is that one of the hold and exhaust solenoid valves is either open-circuited or short-circuited, information corresponding to a present time apparatus information is stored in a memory and the testing is aborted before energizing one of the hold and exhaust solenoid valves.

6. The apparatus of claim 1, wherein:

the electronic control unit energizes the hold solenoid valve at least two times and the electronic control unit energizes the exhaust solenoid valve [the] one time.

7. A method for testing an electronically controlled pneumatic braking system to determine if exhaust and hold solenoid valves in a modulator, controlled by an electronic control unit, controlling a brake sub-system of at least one wheel on a vehicle are properly wired, the method comprising the steps of:

activating a testing signal for the braking system;

energizing a first one of either the hold or exhaust solenoid valve a first number of times greater than or equal to one, and then energizing a second of either the hold or exhaust solenoid valve a second number of times greater than or equal to one, said second number being different than the first number such that a sound is generated when the solenoids in the modulator are correctly wired that is different than a sound that is generated when the solenoids are miswired; and, determining, based on the sound from the energizing step, whether or not the solenoid valves are mis-wired.

8. The method according to claim 7 wherein the braking system includes a plurality of modulators controlling brake sub-systems on a plurality of wheels, further comprising the steps of:

serially performing the energizing the solenoid hold and exhaust valves for each modulator of said plurality of modulators.

9. The method according to claim 8, further comprising the steps of:

pausing a predetermined period of time after the step of energizing the hold and exhaust solenoid valves for each modulator of said plurality of modulators.

10. The method according to claim 9, further comprising the steps of:

energizing the hold solenoid valve more than [two] once and energizing the exhaust solenoid valve once.

11. The apparatus as claimed in claim 1 wherein the electronic control unit energizes one of the hold solenoid valve and the exhaust solenoid valve once, and the electronic control unit energizes another of the hold solenoid valve and the exhaust solenoid valve twice.

12. The method according to claim 7 wherein the energizing step energizes one of the hold solenoid valve and the exhaust solenoid valve once, and the electronic control unit energizes another of the hold solenoid valve and the exhaust solenoid valve twice.

* * * * *